April 1, 1952   W. T. PFISTER   2,591,194
APPARATUS FOR SEPARATING AND CLEANING POTATOES
Filed Sept. 4, 1948   3 Sheets-Sheet 1
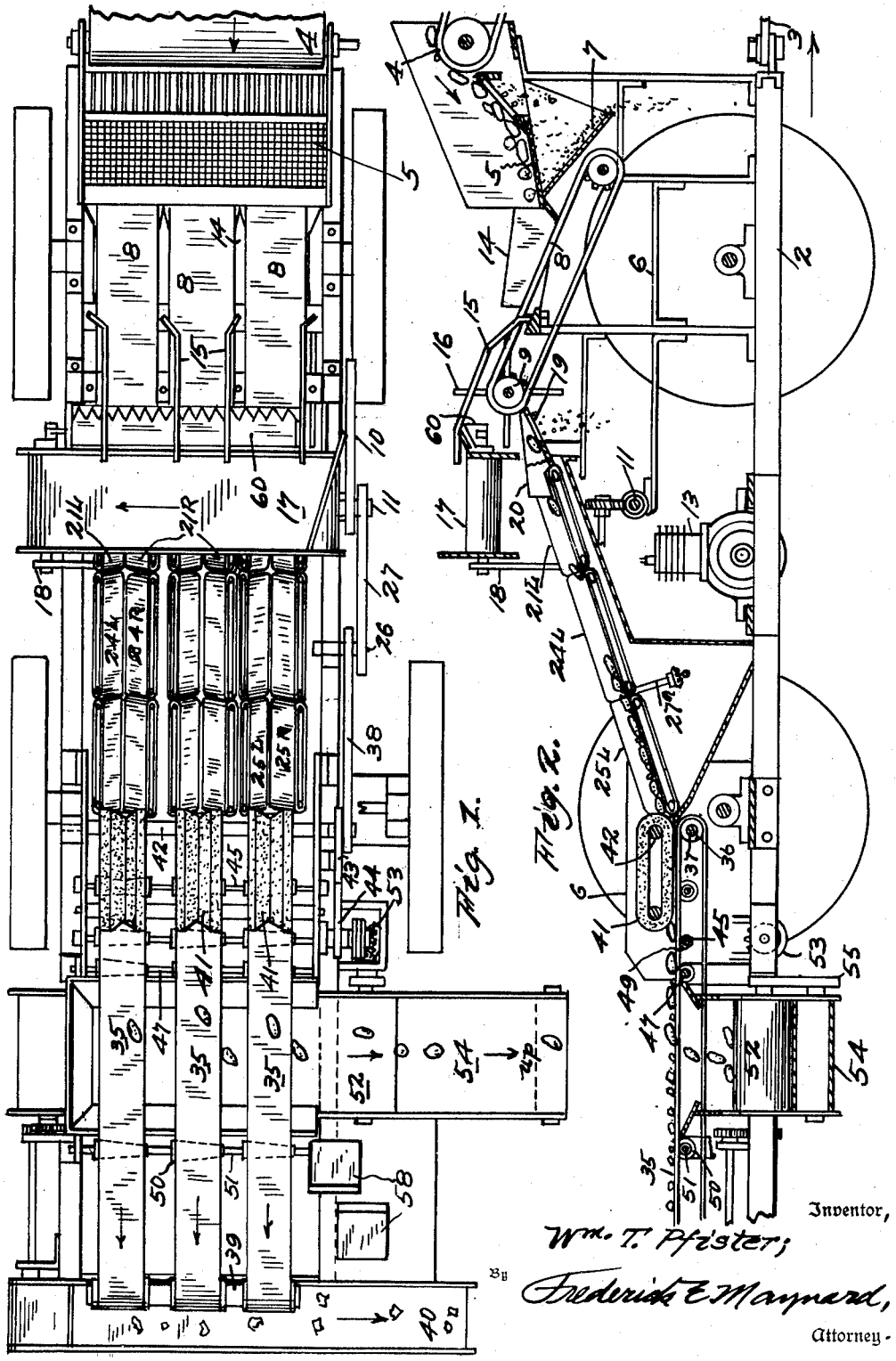

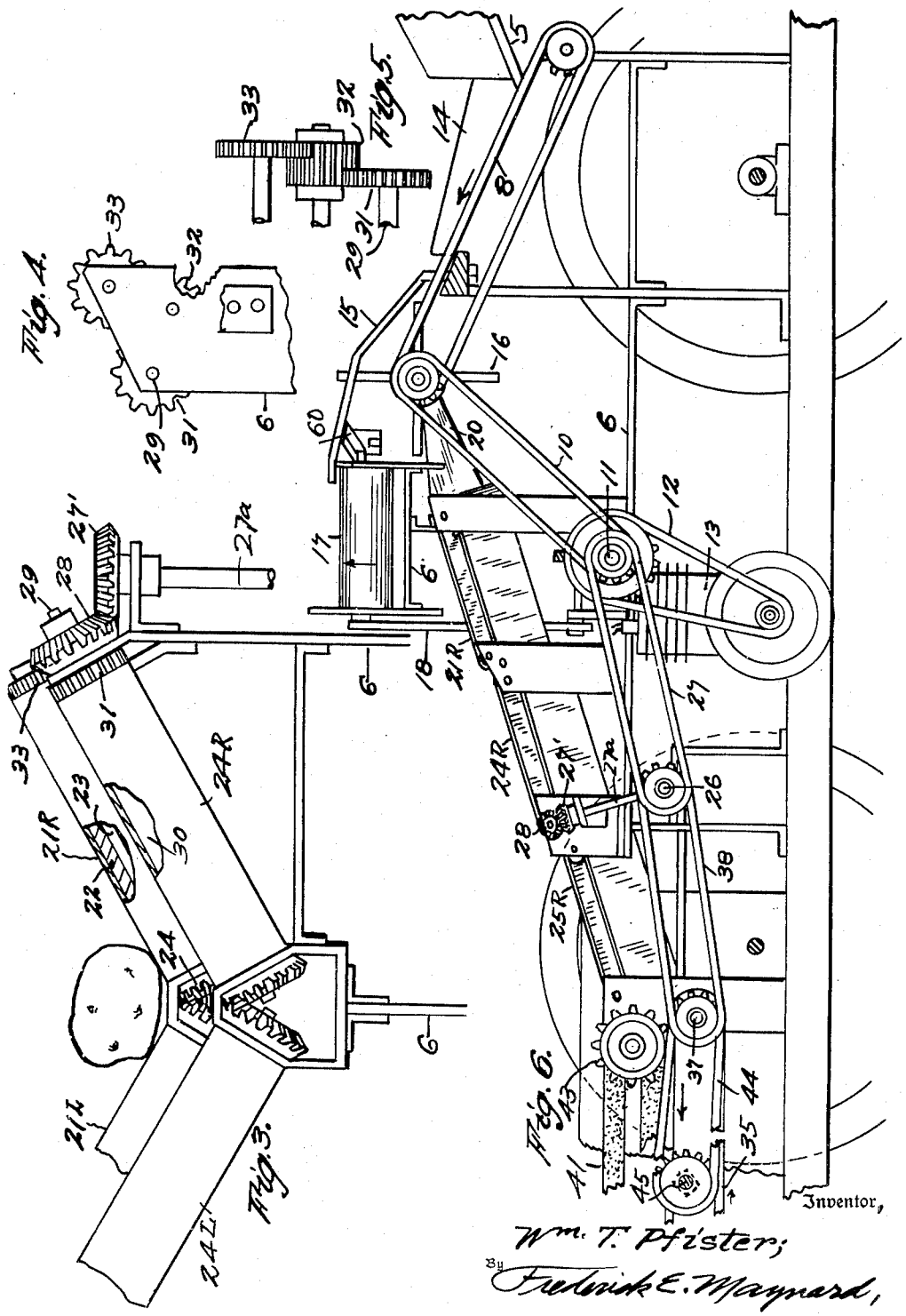

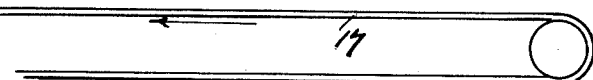
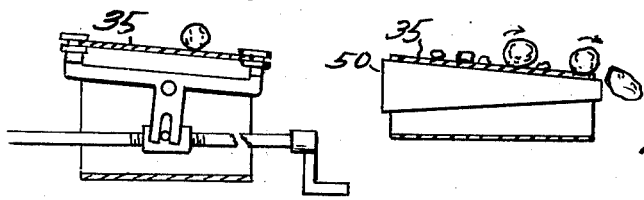
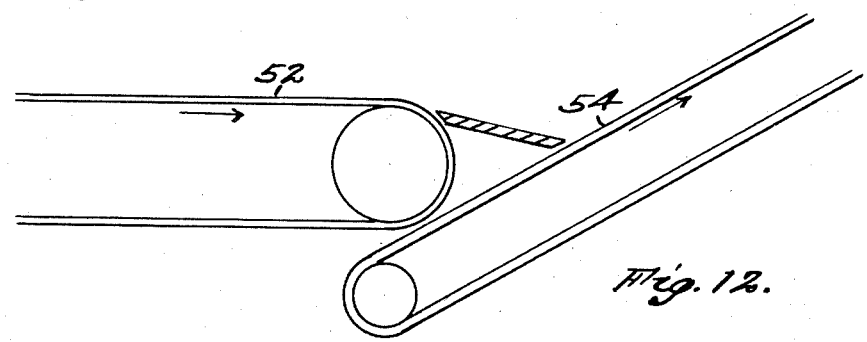

Patented Apr. 1, 1952

2,591,194

UNITED STATES PATENT OFFICE 2,591,194

APPARATUS FOR SEPARATING AND CLEANING POTATOES

William T. Pfister, Los Angeles, Calif.

Application September 4, 1948, Serial No. 47,826

3 Claims. (Cl. 209—114)

This invention is a field machine for separating a large proportion of earth clods and vines from potatoes as they, the potatoes are dug by a lead, combined harvester.

Under general current practice the potatoes are dug and then dumped on the ground to be picked up by hand and placed in sacks. The sacks are later placed on trucks to be hauled to the packing plant. This is slow, laborious and costly.

It is an object of this invention to provide a simple, practical, substantial and efficient wheeled machine to be hauled by and behind, and in operative combination with an appropriate type of harvester whereby potatoes are dug from the field bed and delivered continuously to this separating machine; along with incidental lumps of the bed soil.

Broadly a purpose of the invention is to provide a machine in and by which the commonly elongate, individual potatoes are gradually worked bodily into alinement one behind the other along with lumps of soil, and to provide a continuously acting means whereby the gradually advancing and alined potatoes are more or less successively dumped into a receiving apparatus preferably in the form of a transverse conveyer. And, in this connection, an aim of the invention is to deliver the sorted potatoes by and from the said conveyer to a combined elevator whereby the issue is continuously deposited into an accompanying adjacent box truck for transportation to handling plant for washing and packing.

Also, an intent of the invention is to provide a machine having a system of carrying and treating devices whereby to bring the potatoes into desired alinement, individually, for ultimate separation and discharge from the machine, and in addition to make preliminary discharge of much of the smaller lumps and loose soil while the incoming potatoes are passed to and onto a separating belt.

The invention resides in certain advancements in this art as set forth in the ensuing disclosure and has, with the above outline of purposes, additional objects and advantages as hereinafter developed, and whose constructions, combinations, sub-combinations and details of means and manner of operation, and the method, will be made manifest in the following description of the herewith illustrative embodiment; it being understood that modifications, variations, adaptations and equivalents may be resorted to within the scope, spirit and principles of the invention as it is claimed in conclusion hereof.

Fig. 1 is a plan, and Fig. 2 is a longitudinal, vertical section of the machine. Fig. 3 is an elevational detail of a portion of a set of cascading, potato alining belts. Fig. 4 is a side view of a gear train for driving a related pair of the cascade belts. Fig. 5 is an elevation of the gear train of Fig. 4. Fig. 6 is a sectional, side elevation illustrating the general drive mechanism of functionally running features of the machine.

Fig. 7 is a vertical cross-section of the topmost, cascade belt and its feeder chute, and dirt grizzly. Fig. 8 is a cross-section of the separating belt at one of its troughing rollers. Fig. 9 is a cross-section of the separating belt at a jigger device. Fig. 10 is a cross-section of the last named belt at a tilting device which effects potato rolling and discharge, and Fig. 11 is a view showing a modified form of tilt adjusting device for the belt.

Fig. 12 is a view showing contiguous ends of the cross-discharge conveyer and to-truck elevator.

The vehicular machine includes a wheeled chassis 2 hitched by clevis 3 to a leading potato digging harvester including a tail conveyer 4 by which dug potatoes and soil are continuously dumped onto a suitable screen 5 supported on suitable frame-work 6 of the chassis. Under the screen is a dirt pan 7 to throw off dirt falling loose from the potatoes.

The screen discharges onto the lower end of a set of parallel, coplanar lift conveyer belts 8 having a common head drum 9 on a shaft driven by a sprocket chain train 10 powered by a jack shaft 11, Fig. 6, driven by a chain or other transmission 12 from a prime motor 13. Fixed partitions 14 between the spaced belts 6 lead the potatoes and dirt lumps from the screen to the belts 6 and rearwardly directed, fixed horns 15 guide incidental vines, which are caught by drum fingers 16 to a left-side, discharge carrier 17, such as a belt having a drive transmission 18 from the jack-shaft 11.

Potatoes and dirt lumps fall from the drum belts 8 to a grizzly or screen device 19 of a chute 20 of which there is one for each belt 8.

A noticeable feature of the invention is a means whereby the de-vined potatoes along with dirt lumps are continually brought into alinement (as to each belt 8) and, particularly, in longitudinal alinement of the potatoes one after the other whereby to facilitate ultimate separation and discharge issue of the potatoes from the continuously travelling dirt passing through the machine to its waste end. Such means here includes a set of twin, trough making, downwardly converged or tilted belts arranged in echelon pairs which all have a gradual pitch downward from the respective chute 20. Fig. 3 shows a portion of a topmost V-trough formed by right side belt 21R and left side belt 21L having rollers 22 fixed on paired shafts 23 whose lower ends are supported in parts of framework of the machine and are connected by drive pinions 24. While each belt 21R and its companion 21L pitches or dips laterally, Fig. 3, it also pitches longitudinally, Figs. 1 and 6 towards its next and slightly lower step pair of belts 24R and 24L, of like trough arrangement to receive potatoes and lumps from the upper belts. The belts 24R and 24L pitch down toward and discharge onto lower, pitched trough belts 25R and 25L, Figs. 1 and 6. Throughout, the twin belts, making troughs, are intergeared as at 24, Fig. 3.

Means are provided to drive all of the trough bolts just referred to concurrently with their top stretches in downward flight, and, further, with the speed of travel of the downwardly successive belt pairs, of an echelon, progressively increasing to increase speed of cascade of the potatoes and lumps downwardly. Fig. 6 illustrates a cross-shaft 26 driven by a transmission 27 from the jack-shaft 11. Each echelon of twin belts 21R and 21L, 24R and 24L and 25R and 25L is driven by a respective transmission driven by the cross-shaft and including a bevel gear 27', Figs. 3 and 6, meshing with a companion gear 28 fixed on the upper end of a shaft 29 of the lower roller 30 of the belt 24R, which is intermediate in its echelon. Power is transmitted from the upper roller of each echelon belt to the lower end of the contiguous, next upper belt by means of a respective gear train shown in Figs. 3, 4 and 5 as including a lower gear 31 constantly meshing with an intermediate pinion 32 effective to drive an upper gear 33 of the next belt so that its top stretch will run downward, and in each of these gear sets, for the several cascade echelons, the lowest is smaller than the highest so that the belt speeds increase, downwardly in the series.

As the potatoes and dirt lumps tumble from the several chutes 20 into the cascading series of twin-belts these operate to immediately concentrate the material in the bottom of the trough form and small bodies, as of potatoes and lumps can spill from the spaced edges of the inclined top faces of the belts. As the potatoes tumble they automatically assume a relatively longitudinal order in a row along the trough bottom, and they cascade from one belt stop to the next lower continuously being freed of small lumps and free dirt and under-size potatoes until finally the bottommost belts of each series cascade potatoes and lumps onto a respective longitudinally aligned receiving and sorting belt 35 a plurality of which are mounted on and driven by a forward drum 36 on a shaft 37 mounted in suitable bearings on the frame work of the machine.

The shaft 37 is driven as by a sprocket transmission 38 from the cross-shaft 26. The distal rear ends of the belts 35 are supported on a roller 39 and they discharge dirt lumps onto a transverse waste conveyor 40 with a drive transmission from the running mechanism of the machine.

Means are provided for continual control of the rows of potatoes to keep them in longitudinal arrangement as they pass to the belts 35 from each cascade. This means includes a series of parallel cushion belts 41 arranged to bridge the location of transfer of potatoes onto the front ends of the belts 35 and constantly bear down on the arranged potatoes and effect the passing in coaxial order (as to their lengths) to the belts. The front ends of the cushion belts 41 are carried by a driven drum 42 whose shaft has a sprocket 43 in constant engagement with a sprocket belt 44 which transmits power to a transverse shaft 45.

Referring to Fig. 8 each of the sorting belts 35 is given a valley-form at its forward end by a suitable means such as a loose concaved roller 46 of which a series is supported on a cross-shaft 47, supported in the framework; the potatoes tending to remain in the bed of the valley during rearward flight of the top stretch of the belt.

A novel feature of the invention resides in a means operative to initiate a side rolling movement of the axially disposed potatoes on a belt 35 and also to effect the ultimate throwing off of the potatoes at a discharge, lateral edge of each individual belt 35. Fig. 9 illustrates cross-shaft 45 on which is fixed a series of jigger devices operative, by rotation, to vibrate its imposed belt 35; the device here being a tapered, polygonal roller 49 with its faces pitching, at the top, to the right side edge of the belt so that the adjacent potatoes coming from the valley portion (Fig. 8) of the belt are boosted toward the right, discharge edge of the belt. After passing the jigger device the belt is decidedly tilted downward toward its right ride as by a conical roller 50 of which a plurality are loosely mounted on a cross-shaft 51.

The potatoes fall from the lower edge of the belt 35 onto a receiving conveyer 52 driven by a gear train 53 which is driven by the sprocket belt 44. Potatoes are fed by the conveyer 52 onto an upwardly inclined elevator belt or conveyer 54 to be loaded into a box truck travelling along with the harvester combination of this invention. A transmission 55 from the train 53 drives the elevator.

It is found that while potatoes roll in a high percentage from a sorting or separating belt 35 there is a strong tendency for lumps of soil to remain on the belt and be carried to side discharge waste at the rear end of the machine. Loaded trucks are run off and empty ones are run into position while harvesting is continued.

On the rear end of the machine are provided seats 58 for operatives who may sort possible dirt lumps from the conveyer 52 and pick potatoes that have escaped to conveyer 40.

Under the vine horns is arranged a suitably driven vine clipper 60 to free the potatoes.

The gear 27' is fixed on an upright shaft 27a forming a part of a drive transmission from the cross-shaft 26.

What is claimed is:

1. A machine for cleaning potatoes, having, in combination; a potato receiver, potato alining means to which the receiver discharges, a dirt separating means including a potato support to which the potatoes discharge when alined by said alining means, and presser means to hold the potatoes on said support and consisting of a resilient, spongy, travelling belt disposed longitudinally just above and generally parallel to said separating support; all of the said means being in longitudinal alinement for unidirectional passage of the material thereat; said support including an elongate belt having a generally horizontal potato-carrying top stretch at the forward end of which said spongy belt is arranged to receive potatoes from the alining means, and a jigging means for said stretch.

2. The machine of claim 1; and means arranged rearwardly of the presser means and cooperative with the supporting belt to effect a side roll-off of the potatoes from said stretch.

3. A machine for cleaning harvested potatoes from dug earth lumps, having, in combination, an elongate generally horizontal belt having a receiving top stretch end, means to slightly through said end to carry its load, means for feeding alined potatoes to the troughed end, means to slightly tilt a portion of the belt beyond said stretch transversely to cause the thereat potatoes to roll off of the belt, means to collect the discharged potatoes, and means at the end of the belt to collect material from which the potatoes have been rolled away and which has remained on the belt the alining means including a succession of troughs formed by pairs of bodily, oppositely oblique belts which bodily pitch down toward said receiving sketch and unload thereto, and an elastic body, cushion belt spaced above and along the said sketch to press alined potatoes thereto.

WILLIAM T. PFISTER.

REFERENCES CITED

The following references are of record in the file of this patent:

UNITED STATES PATENTS

| Number | Name | Date |
| --- | --- | --- |
| 387,313 | Scott | Aug. 7, 1888 |
| 1,141,852 | Sutton et al. | June 1, 1915 |
| 1,196,048 | Sutton | Aug. 29, 1916 |
| 1,309,401 | Fogelsonger | July 8, 1919 |
| 1,353,059 | Meyer | Sept. 14, 1920 |
| 1,365,129 | Thornton | Jan. 11, 1921 |
| 1,625,257 | Ingolfsrud et al. | Apr. 19, 1927 |
| 1,735,796 | Robbins | Nov. 12, 1929 |
| 1,918,398 | Johnson | July 18, 1933 |
| 2,013,409 | Hostetter | Sept. 3, 1935 |
| 2,015,549 | Dwyer et al. | Sept. 24, 1935 |
| 2,195,628 | Marsden | Apr. 2, 1940 |
| 2,205,059 | Clark | June 18, 1940 |
| 2,293,133 | Halferty | Aug. 18, 1942 |
| 2,350,332 | Albaugh | June 6, 1944 |
| 2,417,878 | Luzietti et al. | Mar. 25, 1947 |